(12) United States Patent
Wang

(10) Patent No.: US 9,386,435 B2
(45) Date of Patent: Jul. 5, 2016

(54) INFORMATION TRANSMISSION METHOD, DEVICE AND SERVER

(71) Applicant: Lenovo (Beijing) Co., Ltd., Beijing (CN)

(72) Inventor: Hui Wang, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 360 days.

(21) Appl. No.: 14/159,983

(22) Filed: Jan. 21, 2014

(65) Prior Publication Data

US 2014/0207852 A1  Jul. 24, 2014

(30) Foreign Application Priority Data

Jan. 21, 2013 (CN) .......................... 2013 1 0021425

(51) Int. Cl.
| | |
|---|---|
| G06F 15/16 | (2006.01) |
| H04W 4/20 | (2009.01) |
| H04M 1/725 | (2006.01) |
| G06F 3/0488 | (2013.01) |

(52) U.S. Cl.
CPC ............. H04W 4/206 (2013.01); G06F 3/0488 (2013.01); H04M 1/7253 (2013.01); *H04M 2250/22* (2013.01); *H04M 2250/64* (2013.01)

(58) Field of Classification Search
CPC .. H04W 4/206; G06F 3/0488; H04M 1/7253; H04M 2250/22; H04M 2250/64
See application file for complete search history.

(56) References Cited

U.S. PATENT DOCUMENTS

| | | | | |
|---|---|---|---|---|
| 2010/0138743 | A1* | 6/2010 | Chou .................... | G06F 3/0486 715/702 |
| 2010/0165965 | A1* | 7/2010 | Carlton .................... | H04W 4/02 370/338 |
| 2010/0281363 | A1* | 11/2010 | Inaba .................... | G06F 3/0488 715/702 |
| 2012/0102400 | A1* | 4/2012 | Worley .................. | G06F 3/0488 715/702 |
| 2012/0158352 | A1* | 6/2012 | Esaka .................... | G06F 3/0488 702/150 |
| 2013/0141371 | A1* | 6/2013 | Hallford ............... | G06F 3/0488 345/173 |
| 2014/0019874 | A1* | 1/2014 | Li .......................... | H04L 67/06 715/748 |
| 2014/0040762 | A1* | 2/2014 | Kuscher ............ | H04M 1/72519 715/748 |
| 2014/0075385 | A1* | 3/2014 | Wan .................... | G06Q 10/1093 715/812 |
| 2014/0325389 | A1* | 10/2014 | Willis .................. | G06F 3/0486 715/753 |
| 2015/0012831 | A1* | 1/2015 | Boggess ............... | G06F 3/1454 715/733 |

FOREIGN PATENT DOCUMENTS

SE    WO 2010100075 A1 *  9/2010  ............ G06F 3/0486

* cited by examiner

*Primary Examiner* — Jonathan Bui
(74) *Attorney, Agent, or Firm* — Harness, Dickey & Pierce, P.L.C.

(57) ABSTRACT

An information transmission method is provided to improve efficiency of data transmission between a cell phone and a computer. The method includes: acquiring a first operation; moving, in response to the first operation, a first object of at least one object displayed in a display module from the display module to a touch control module; acquiring current first time parameter when it is detected that the first object reaches a first edge of the display module; uploading the first time parameter to a server, so that the server determines, according to the first time parameter and second time parameter uploaded by a second device, whether to allow a first device to transmit the first object to the second device; and transmitting the first object to the second device according to a first operational instruction sent from the server.

13 Claims, 5 Drawing Sheets

INFORMATION TRANSMISSION METHOD, DEVICE AND SERVER

CROSS REFERENCE TO RELATED APPLICATION

This application claims the benefit of priority to Chinese Patent Application No. 201310021425.6, entitled "INFORMATION TRANSMISSION METHOD, ELECTRONIC DEVICE AND SERVER", filed on Jan. 21, 2013 with State Intellectual Property Office of PRC, which is incorporated herein by reference in its entirety.

FIELD

The invention relates to the filed of computers and embedded systems, and in particular to an information transmission method and a transmission device.

BACKGROUND

With the development of technology, users often need to transmit data between different electronic devices, for example, the users of two cell phones need to interchange images, texts and other data between the two cell phones.

In the existing technology, Wi-Fi Direct Communication and Near Field Communication (NFC) are often adopted for transmitting data between two cell phones.

For instance, in Wi-Fi Direct mode, once there is no Wi-Fi hotspot, data can be transmitted via the direct connection between devices. That is to say, without hotspot base station, router or application processor (AP), the device conforming to Wi-Fi Direct standard may be connected directly to other device to transmit data or share applications.

In NFC mode, the data may be transmitted between two cell phones, provided the two cell phones are both installed with NFC chips.

The applicant of the invention found the following problems in the existing technology:

in the existing technology, there is no efficient transmission solution between the cell phone and the computer which is comparable to the efficient transmission solution between the cell phones.

SUMMARY

Embodiments of the invention provide an information transmission method and a transmission device, so as to solve the technical problem that data transmission between a cell phone and a computer is inefficient, thus achieving a technical effect of improving the efficiency of data transmission between the cell phone and the computer.

An information transmission method applied to a first device is provided, wherein the first device is capable of communicating respectively with a second device and a server, the first device comprises a display module, the second device comprises a touch control module not capable of displaying, the display module displays at least one object, the first device and the second device are in a first spatial position relationship, and the method includes:

acquiring a first operation;

moving, in response to the first operation, a first object of the at least one object displayed in the display module from the display module to the touch control module;

acquiring current first time parameter when it is detected that the first object reaches a first edge of the display module;

uploading the first time parameter to a server, so that the server determines, according to the first time parameter and second time parameter uploaded by the second device, whether to allow the first device to transmit the first object to the second device; and transmitting the first object to the second device according to a first operational instruction sent from the server.

Preferably, the first object is multimedia data.

Preferably, the first time parameter is first moment information about a moment when the first object reaches the first edge of the display module.

Preferably, after the transmitting the first object to the second device according to a first operational instruction sent from the server, the method further includes: determining that a spatial position relationship between the first device and the second device is changed from the first spatial position relationship to a second spatial position relationship different from the first spatial position relationship.

An information transmission method applied to a second device, wherein the second device is capable of communicating respectively with a first device and a server, the first device comprises a display module, the second device comprises a touch control module not capable of displaying, the display module displays at least one object, the first device and the second device are in a first spatial position relationship, and the method includes:

detecting that a second operation occurs at a first edge of the touch control module;

acquiring, in response to the second operation, current second time parameter;

uploading the second time parameter to a server, so that the server determines, according to the second time parameter and first time parameter uploaded by the first device, whether to allow the first device to transmit the first object to the second device; and receiving the first object sent from the first device.

Preferably, the first object is multimedia data.

Preferably, the second time parameter is second moment information about a moment when it is detected that the second operation occurs at the first edge of the touch control module.

An information transmission method applied to a server, wherein the server is capable of communicating respectively with a first device and a second device, the first device and the second device are in a first spatial position relationship, and the method includes:

receiving respectively first time parameter sent from the first device and second time parameter sent from the second device;

judging whether a first preset condition is met by the first time parameter and the second time parameter, and obtaining a first judgment result;

if the first judgment result indicates that the first preset condition is met by the first time parameter and the second time parameter, sending a first operational instruction to the first device such that the first device sends the first object to the second device.

Preferably, the first time parameter is first moment information about a moment when the first object reaches a first edge of the display module, and the second time parameter is second moment information about a moment when it is detected that a second operation occurs at a first edge of the touch control module.

Preferably, the judging whether a first preset condition is met by the first time parameter and the second time parameter includes:

judging whether a first time difference between a second moment corresponding to the second moment information and a first moment corresponding to the first moment information is not greater than a preset time difference; and in the case that the first time difference is not greater than the preset time difference, obtaining the first judgment result indicating that the first preset condition is met by the first time parameter and the second time parameter.

Preferably, after or before the receiving respectively first time parameter sent from the first device and second time parameter sent from the second device, the method further includes: receiving respectively first position parameter sent from the first device and second position parameter sent from the second device.

Preferably, the first position parameter is first position information for the first object when the first object reaches a first edge of the display module, and the second position parameter is second position information for the first object when it is detected that a second operation occurs at a first edge of the touch control module.

Preferably, before the judging whether a first preset condition is met by the first time parameter and the second time parameter, the method further includes: judging whether a second preset condition is met by the first position parameter and the second position parameter, and obtaining a second judgment result;

the judging whether a first preset condition is met by the first time parameter and the second time parameter includes: in the case that the second judgment result indicates that the second preset condition is met by the first position parameter and the second position parameter, judging whether the first preset condition is met by the first time parameter and the second time parameter.

Preferably, before the sending a first operational instruction to the first device, the method further includes: judging whether a second preset condition is met by the first position parameter and the second position parameter, and obtaining a second judgment result;

the sending a first operational instruction to the first device includes: in the case that the second judgment result indicates that a second preset condition is met by the first position parameter and the second position parameter, judging whether the first preset condition is met by the first time parameter and the second time parameter.

Preferably, after the sending a first operational instruction to the first device such that the first device sends a first object to the second device in the case that the first judgment result indicates that the first preset condition is met by the first time parameter and the second time parameter, the method further includes: determining that a spatial position relationship between the first device and the second device is changed from the first spatial position relationship to a second spatial position relationship different from the first spatial position relationship.

Preferably, after the determining that a spatial position relationship between the first device and the second device is changed from the first spatial position relationship to a second spatial position relationship different from the first spatial position relationship, the method further includes:

receiving respectively the first time parameter sent from the first device and the second time parameter sent from the second device;

judging whether a first preset condition is met by the first time parameter and the second time parameter, and obtaining the first judgment result;

in the case that the first judgment result indicates that the first preset condition is not met by the first time parameter and the second time parameter, prohibiting sending the first operational instruction to the first device, wherein the first operational instruction instructs the first device to transmit a second object to the second device.

A device which is capable of communicating respectively with a second device and a server, wherein the device comprises a display module, the second device comprises a touch control module not capable of displaying, the display module displays at least one object, the first device and the second device are in a first spatial position relationship, and the device further includes:

a first acquisition module, configured to acquire a first operation;

a moving module, configured to move, in response to the first operation, a first object of at least one object displayed in the display module from the display module to the touch control module;

a second acquisition module, configured to acquire current first time parameter when it is detected that the first object reaches a first edge of the display module;

a first uploading module, configured to upload the first time parameter to a server so that the server determines, according to the first time parameter and second time parameter uploaded by the second device, whether to allow the first device to transmit the first object to the second device; and a transmission module, configured to transmit the first object to the second device according to a first operational instruction sent from the server.

Preferably, the first object is multimedia data.

Preferably, the first time parameter is first moment information about a moment when the first object reaches a first edge of the display module.

Preferably, the device further includes a first determination module configured to determine that a spatial position relationship between the first device and the second device is changed from the first spatial position relationship to a second spatial position relationship different from the first spatial position relationship.

A which is capable of communicating respectively with a first device and a server, wherein the first device comprises a display module, the device comprises a touch control module not capable of displaying, the display module displays at least one object, the first device and the device are in a first spatial position relationship, and the device further includes:

a detection module, configured to detect that a second operation occurs at a first edge of the touch control module, wherein the first edge of the touch control module is an edge where the touch control module contacts with the display module;

a third acquisition module, configured to acquire, in response to the second operation, current second time parameter;

a second uploading module, configured to upload the second time parameter to a server, so that the server determines, according to the second time parameter and first time parameter uploaded by the first device, whether to allow the first device to transmit the first object to the second device; and a first receiving module, configured to receive the first object sent from the first device.

Preferably, the first object is multimedia data.

Preferably, the second time parameter is second moment information about a moment when it is detected that a second operation occurs at a first edge of the touch control module.

A server which is capable of communicating respectively with a first device and a second device, wherein the first device and the second device are in a first spatial position relationship, and the server includes:

a second receiving module, configured to receive respectively first time parameter sent from the first device and second time parameter sent from the second device;

a judgment module, configured to judge whether a first preset condition is met by the first time parameter and the second time parameter, and obtain a first judgment result; and a sending module, configured to, in the case that the first judgment result indicates that the first preset condition is met by the first time parameter and the second time parameter, send a first operational instruction to the first device such that the first device sends a first object of the second device.

Preferably, the first time parameter is first moment information about a moment when the first object reaches a first edge of the display module, and the second time parameter is second moment information about a moment when it is detected that a second operation occurs at a first edge of the touch control module.

Preferably, the judgment module is configured to:

judge whether a first time difference between a second moment corresponding to the second moment information and a first moment corresponding to the first moment information is not greater than a preset time difference; and in the case that it is judged that the first time difference is not greater than the preset time difference, obtain the first judgment result indicating that the first preset condition is met by the first time parameter and the second time parameter.

Preferably, the second receiving module is further configured to receive respectively first position parameter sent from the first device and second position parameter sent from the second device.

Preferably, the first position parameter is first position information for the first object when the first object reaches a first edge of the display module, and the second position parameter is second position information for the first object when it is detected that a second operation occurs at a first edge of the touch control module.

Preferably, the judgment module is further configured to:

judge whether a second preset condition is met by the first position parameter and the second position parameter, and obtain a second judgment result; and if the second judgment result indicates that the second preset condition is met by the first position parameter and the second position parameter, judge whether the first preset condition is met by the first time parameter and the second time parameter.

Preferably, the server further includes a second determination module configured to determine that a spatial position relationship between the first device and the second device is changed from the first spatial position relationship to a second spatial position relationship different from the first spatial position relationship.

Preferably, the device further includes a prohibition module;

the receiving module is further configured to receive respectively the first time parameter sent from the first device and the second time parameter sent from the second device;

the judgment module is further configured to judge whether a first preset condition is met by the first time parameter and the second time parameter, and obtain a first judgment result;

the prohibition module is configured to, if the first judgment result indicates that the first preset condition is not met by the first time parameter and the second time parameter, prohibit sending the first operational instruction to the first device, wherein the first operational instruction instructs the first device to transmit a second object to the second device.

The information transmission method according to the embodiments of the invention may be applied to a first device. The first device may communicate with a second device; the first device may have a display module, and the second device may have a touch control module, where the touch control module does not have a display function; the display module contacts with the touch control module, and the display module includes at least one object; the method may include: acquiring a first operation; moving, in response to the first operation, a first object of the at least one object included in the display module from the display module to the touch control module; acquiring current first spatial parameter when it is detected that the first object reaches a first edge of the display module, where the first edge of the display module is an edge where the display module contacts with the touch control module; uploading the first spatial parameter to a server; and transmitting the first object to the second device according to a first operational instruction sent from the server.

In the embodiments of the invention, when the display module contacts with the touch control module, the first object included in the display module may be moved directly to the touch control module. When the first object is moved to the touch control module, the first object may be transmitted to the second device, hence the data transmission between a cell phone and a computer may be realized without a dedicated transmission line; and the operation is simple, thereby enhancing the transmission efficiency.

DETAILED DESCRIPTION

The information transmission method according to an embodiment of the invention may be applied to a first device. The first device may communicate with a second device; the first device may have a display module, and the second device may have a touch control module, where the touch control module does not have a display function; the display module contacts with the touch control module, and the display module includes therein at least one object. The method may include: acquiring a first operation; moving, in response to the first operation, a first object of the at least one object included in the display module from the display module to the touch control module; acquiring current first spatial parameter when it is detected that the first object reaches a first edge of the display module, where the first edge of the display module is an edge where the display module contacts with the touch control module; uploading the first spatial parameter to a server; and transmitting the first object to the second device according to a first operational instruction sent from the server.

In the embodiment of the invention, when the display module contacts with the touch control module, the first object included in the display module may be moved directly to the touch control module. When the first object is moved to the touch control module, the first object may be transmitted to the second device, hence the data transmission between a cell phone and a computer may be realized without a dedicated transmission line; and the operation is simple, thereby enhancing the transmission efficiency.

As used herein, the term "device" includes but not limited to electronic device, electrical device or the like. For example, the device may be a computer, a laptop or a handheld phone such as a smartphone. The first device may be of the same type as the second device, or the first device may be of a different type from the second device.

Figure 1:
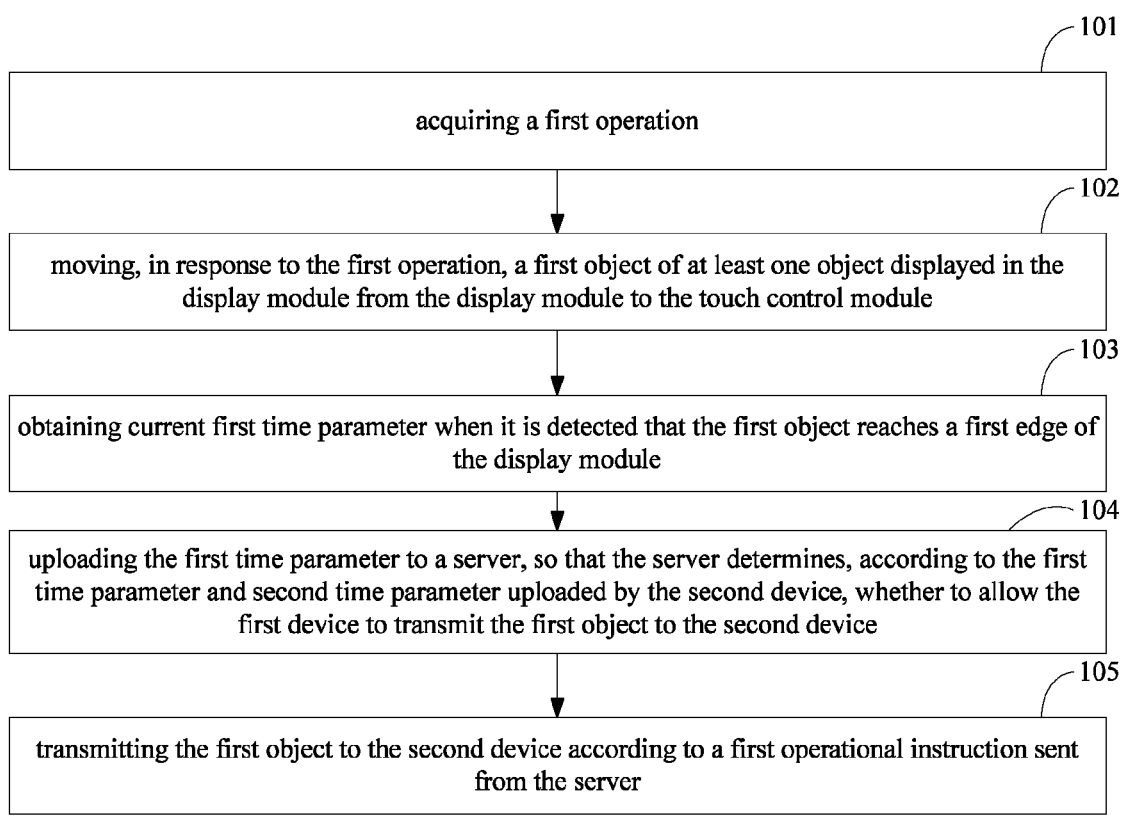
FIG. 1 is a main flow chart of a first information transmission method according to an embodiment of the invention.

Referring to FIG. 1, the information transmission method according to an embodiment of the invention may be applied to a first device. The first device may communicate with a second device and a server; the first device may have a display module, and the second device may have a touch control module, the touch control module may not have a display function, and the display module may display therein at least one object. The first device and the second device may be in a first spatial position relationship. The main process of the method includes steps 101, 102, 103, 104.

Step 101: acquiring a first operation.

Firstly, the first device may acquire the first operation, for example, the first operation may be an operation performed by an operating object on the display module. Preferably, in the embodiment of the invention, the display module may be a touch display module, i.e., the display module supports a touch control operation, and a user may perform directly on the display module a touch control operation toward the at least one object included in the display module.

In the embodiment of the invention, the first operation may be a moving operation, i.e., moving a first object on the display module by the operating object, where the first object may be one of the at least one object. In the embodiment of the invention, the first object may refer to multimedia data. For example, the first object may be an image, a video or an audio object displayed on the display module.

Step 102: moving, in response to the first operation, a first object of the at least one object displayed in the display module from the display module to the touch control module.

After acquiring the first operation, the first device may move, in response to the first operation, the first object included in the display module from the display module to the touch control module.

In the embodiment of the invention, because the display module contacts with the touch control module, the first device may move, in response to the first operation, the first object from the display module to a first edge of the display module, where the first edge of the display module is an edge where the display module contacts with the touch control module. When the first object reaches the first edge of the display module, the first object may be moved from the first edge of the display module to a first edge of the touch control module without stay, where the first edge of the touch control module is an edge where the touch control module contacts with the display module. When the first object reaches the first edge of the touch control module, it means the moving is already completed and the first object is already moved from the first device to the second device. In order to ensure that the first object is moved from the first device to the second device, when the first object reaches the first edge of the touch control module, the first object may be kept on moving to the touch control module without stay, hence it may be ensured that the first object is successfully moved.

In the embodiment of the invention, after the first object is moved from the first device to the second device, the first device may still have the first object stored in the first device, i.e., after moving the first object, the first device and the second device may both include the first object; hence the normal use for each user may not be affected.

Step 103: acquiring current first time parameter when the first object reaches the first edge of the display module.

In the embodiment of the invention, in the moving of the first object within the display module, the first device may monitor the moving in real time, periodically or when triggered.

When it is detected that the first object reaches the first edge of the display module, the first device may obtain the current first time parameter, where the current first time parameter may refer to the current time parameter of the first object.

In the embodiment of the invention, the first time parameter may be the first moment information about a moment when the first object reaches the first edge of the display module.

Preferably, in the embodiment of the invention, the first device may acquire the first position parameter while acquiring the first time parameter, where the first position parameter may be the first position information for the first object when the first object reaches the first edge of the display module.

In the embodiment of the invention, the first moment information and the first position information may be obtained simultaneously, i.e., at the first moment corresponding to the first moment information, the first object is located at a first position corresponding to the first position information.

Alternatively, in the embodiment of the invention, the first device may acquire only the first time parameter without the need of acquiring the first position parameter.

Step 104: uploading the first time parameter to a server, so that the server determines, according to the first time parameter and second time parameter uploaded by the second device, whether to allow the first device to transmit the first object to the second device.

In the embodiment of the invention, after obtaining the first time parameter, the first device may upload the first time parameter to the server. The server may process the first time parameter to determine whether to allow the first device to transmit the first object to the second device.

Preferably, in the embodiment of the invention, if the first device also obtains the first position parameter, the first position parameter may also be uploaded to the server. The server may process both the first time parameter and the first position parameter to determine whether to allow the first device to transmit the first object to the second device.

In the embodiment of the invention, in the moving of the first object on the touch control module, the second device may monitor the moving in real time, periodically or when triggered.

In the embodiment of the invention, when the first object reaches the first edge of the touch control module, the second device may obtain the current second time parameter, where the second time parameter may refer to the current time parameter of the first object.

In the embodiment of the invention, the second time parameter may be the second moment information about a moment when the first object reaches the first edge of the touch control module.

Preferably, in the embodiment of the invention, the second device may also acquire second position parameter while acquiring the second time parameter, where the second position parameter may be the second position information for the first object when the first object reaches the first edge of the touch control module.

In the embodiment of the invention, the second moment information and the second position information may be obtained simultaneously, i.e., at the second moment corresponding to the second moment information, the first object is located at the second position corresponding to the second position information, where the second position may be on the touch control module.

Alternatively, in the embodiment of the invention, the first device may acquire only the second time parameter without the need of acquiring the second position parameter.

In the embodiment of the invention, after obtaining the second time parameter, the second device may upload the second time parameter to the server. The server may process the second time parameter to determine whether to allow the first device to transmit the first object to the second device.

Preferably, in the embodiment of the invention, if the second device also obtains the second position parameter, the second position parameter may also be uploaded to the server. The server may process the second time parameter and the second position parameter to determine whether to allow the first device to transmit the first object to the second device.

After obtaining the first time parameter and the second time parameter, the server may judge whether a first preset condition is met by the first time parameter and the second time parameter, and obtain a first judgment result. If the first judgment result indicates that the first preset condition is met by the first time parameter and the second time parameter, the server may send a first operational instruction to the first device, so as to instruct the first device to send the first object to the second device.

In the embodiment of the invention, the server judging whether the first preset condition is met by the first time parameter and the second time parameter may be as follows:

the server may judge whether a first time difference between the second moment corresponding to the second moment information and the first moment corresponding to the first moment information is not greater than a preset time difference. If it is judged that the first time difference between the second moment corresponding to the second moment information and the first moment corresponding to the first moment information is not greater than the preset time difference, the first judgment result which indicates that the first preset condition is met by the first time parameter and the second time parameter may be obtained.

In the embodiment of the invention, if the first judgment result indicates that the first preset condition is met by the first time parameter and the second time parameter, the server may make a determination to allow to the first device to transmit the first object to the second device.

Preferably, if the first device also uploads the first position parameter to the server and the second device also uploads the second position parameter to the server, the server may judge whether a second preset condition is met by the first position parameter and the second position parameter, and obtain a second judgment result. The second judgment result may be used to indicate whether the second preset condition is met by the first position parameter and the second position parameter. If it is judged that the first preset condition is met by the first time parameter and the second time parameter and the second preset condition is met by the first position parameter and the second position parameter, the server may make a determination to allow the first device to send the first object to the second device.

In the embodiment of the invention, the first preset condition may be that: the first time difference between the second moment corresponding to the second moment information and the first moment corresponding to the first moment information is not greater than the preset time difference.

In the embodiment of the invention, the second preset condition may be that: a first distance between the first position corresponding to the first position information and the second position corresponding to the second position information is not greater than a preset distance.

Alternatively, the first time parameter and the first position parameter may be collectively referred to as the first spatial parameter, and the second time parameter and the second position parameter may be collectively referred to as the second spatial parameter.

The server may judge whether a third preset condition is met by the first spatial parameter and the second spatial parameter.

In the embodiment of the invention, the third preset condition may be that: the first time difference between the second moment corresponding to the second moment information and the first moment corresponding to the first moment information is not greater than the preset time difference, and the first distance between the first position corresponding to the first position information and the second position corresponding to the second position information is not greater than the preset distance.

Optionally, the server judging whether the third preset condition is met by the first spatial parameter and the second spatial parameter may be as follows:

the server may firstly judge whether the first distance between the first position corresponding to the first position information and the second position corresponding to the second position information is not greater than the preset distance; if it is judged that the first distance is not greater than the preset distance, the server may judge whether the first time difference between the second moment corresponding to the second moment information and the first moment corresponding to the first moment information is not greater than the preset time difference; if it is judged that the first time difference between the second moment corresponding to the second moment information and the first moment corresponding to the first moment information is not greater than the preset time difference, the first judgment result which indicates that the third preset condition is met by the first spatial parameter and the second spatial parameter may be obtained.

Alternatively, the sever may firstly judge whether the first time difference between the second moment corresponding to the second moment information and the first moment corresponding to the first moment information is not greater than the preset time difference; if it is judged that the first time difference between the second moment corresponding to the second moment information and the first moment corresponding to the first moment information is not greater than the preset time difference, the server may judge whether the first distance between the first position corresponding to the first position information and the second position corresponding to the second position information is not greater than the preset distance; if it is judged that the first distance is not greater than the preset distance, the first judgment result which indicates that the third preset condition is met by the first spatial parameter and the second spatial parameter may be obtained.

In the embodiment of the invention, both the first position information and the second position information may be specific coordinate information, which may be coordinate information in the same coordinate system, thus the first distance between the first position and the second position may be calculated according to specific coordinates, thereby the calculation result may be relatively accurate.

Step 105: transmitting the first object to the second device according to a first operational instruction sent from the server.

When it is determined by the server that the first preset condition is met by the first time parameter and the second time parameter, the server makes a determination to allow the first device to transmit the first object to the second device.

Alternatively, when it is determined by the server that the third preset condition is met by the first spatial parameter and the second spatial parameter, the server makes a determination to allow the first device to transmit the first object to the second device.

At this time, the server may send the first operational instruction to the first device. After receiving the first operational instruction, the first device may transmit the first object to the second device according to the first operational instruction.

In the embodiment of the invention, the first device, the second device and the server perform processes so quickly that the user does not feel any waiting time. For example, if the first device is a cell phone, the display module is the touch screen of the cell phone, the second device is a notebook computer, the touch control module is the touch pad of the notebook computer, the user places the cell phone at an edge of the touch pad of the notebook computer such that the edge of the touch screen of the cell phone contacts with the edge of the touch pad of the notebook computer, hence the user may transmit multimedia data in the cell phone to the notebook computer by a sliding operation, or transmit multimedia data in the notebook computer to the cell phone by a sliding operation.

Preferably, after the first object is transmitted to the second device, the display module of the second device may display the first object.

In the embodiment of the invention, after the first object is transmitted to the second device according to the first operational instruction sent from the server, if the user moves the first device or the second device, the spatial position relationship between the first device and the second device may change, and the first device may determine that the spatial position relationship between the first device and the second device is changed from the first spatial position relationship to a second spatial position relationship, where the first spatial position relationship is different from the second spatial position relationship.

For example, the first edge of the display module may correspond to the first edge of the first device, the first edge of the touch control module may correspond to the first edge of the second device; and when the first device and the second device are in the first spatial position relationship, the first edge of the first device and the first edge of the second device may contact with each other.

When the first device and the second device are in the second spatial position relationship, the first edge of the first device and the first edge of the second device may not contact with each other. At this time, it may be the case that a second edge of the first device contacts with the first edge of the second device, or another edge of the first device contacts with another edge of the second device.

If the first object is moved from the first edge of the display module to the first edge of the touch control module when the first device and the second device are in the first spatial position relationship, then after the spatial position relationship between the first device and the second device is adjusted to the second spatial position relationship, if it needs to move a second object, the time required for moving the second object from the first edge of the display module to the first edge of the touch control module may be more than the time required for moving the first object, the incurred time difference may be greater than the preset time difference, the first preset condition may not be met by the first time parameter and the second time parameter, the server may not allow the first device to transmit the second object to the second device, and the transmission may fail.

In the embodiment of the invention, if it is determined that the transmission fails, the second object may stay at the edge of the display module, i.e., the second object may stay at the first position corresponding to the first moment, where the first position is in the display module. The first moment may be the moment corresponding to the first time parameter.

Alternatively, if it is determined that the transmission fails, the second object may automatically return to the position in the display module where the second object is located before the transmission.

Figure 2:
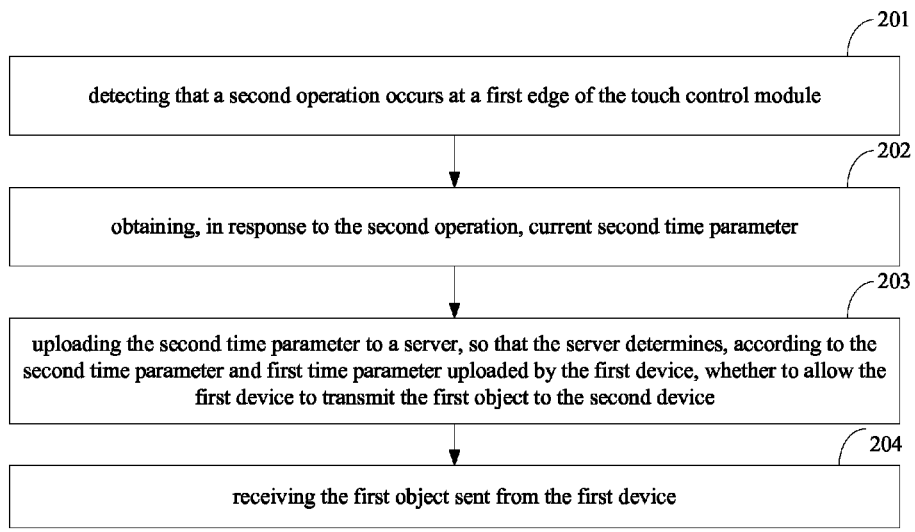
FIG. 2 is a main flow chart of a second information transmission method according to an embodiment of the invention.

Referring to FIG. 2, the disclosure further provides an information transmission method which may be applied to a second device. The second device may communicate respectively with the first device and the server. The first device may include the display module, the second device may include the touch control module, the touch control module may not have a display function, and the display module may display therein at least one object. The first device and the second device may be in a first spatial position relationship. The main process of the method includes steps 201, 202, 203, 204.

Step 201: detecting that a second operation occurs at the first edge of the touch control module.

Firstly, the first device may obtain the first operation. For example, the first operation may be an operation performed by an operating object on the display module of the first device. Preferably, in the embodiment of the invention, the display module may be a touch display module, i.e., the display module supports a touch-control operation, and a user may perform directly on the display module a touch control operation toward the at least one object displayed in the display module.

In the embodiment of the invention, the first operation may be a moving operation, i.e., the operation of moving a first object on the display module by the operating object, where the first object may be one of the at least one object. In the embodiment of the invention, the first object may refer to multimedia data.

After acquiring the first operation, the first device may move, in response to the first operation, the first object included in the display module from the display module to the touch control module.

In the embodiment of the invention, the first device may move, in response to the first operation, the first object from the display module to a first edge of the display module. When the first object reaches the first edge of the display module, it may be moved from the first edge of the display module to a first edge of the touch control module without stay. When the first object reaches the first edge of the touch control module, it means the moving is already completed and the first object is already moved from the first device to the second device. In order to ensure that the first object is moved from the first device to the second device, when the first object reaches the first edge of the touch control module, the first object may be kept on moving to the touch control module without stay, hence it may be ensured that the first object is successfully moved.

When the first object reaches the first edge of the touch control module of the second device, the second device may detect that a second operation occurs at the first edge of the touch control module. In the embodiment of the invention, the second operation may be a moving operation on the touch control module.

Step 202: obtaining, in response to the second operation, the current second time parameter.

In the embodiment of the invention, when the first object reaches the first edge of the touch control module, the second device may obtain the current second time parameter, where the second time parameter may refer to the current time parameter of the first object.

In the embodiment of the invention, the second time parameter may be the second moment information about a moment when the first object reaches the first edge of the touch control module.

Preferably, in the embodiment of the invention, the second device may also acquire the second position parameter while acquiring the second time parameter, i.e., the second device may obtain the second spatial parameter. The second position parameter may be the second position information for the first object when the first object reaches the first edge of the touch control module.

In the embodiment of the invention, the second moment information and the second position information may be obtained simultaneously, i.e., at the second moment corresponding to the second moment information, the first object is located at a second position corresponding to the second position information, where the second position may be on the touch control module.

Alternatively, in the embodiment of the invention, the first device may acquire only the second time parameter without the need of acquiring the second position parameter.

Step 203: uploading the second time parameter to a server, so that the sever determines, according to the second time parameter and first time parameter uploaded by the first device, whether to allow the first device to transmit the first object to the second device.

In the embodiment of the invention, after the second time parameter is obtained, the second time parameter may be uploaded to the server. The server may process the second time parameter to determine whether to allow the first device to transmit the first object to the second device.

In the embodiment of the invention, if the second spatial parameter is acquired by the second device, the second spatial parameter may be uploaded to the server. The server will process the second spatial parameter to determine whether to allow the first device to transmit the first object to the second device.

After obtaining the first time parameter and the second time parameter, the server may judge whether the first preset condition is met by the first time parameter and the second time parameter, and obtain a first judgment result. If the first judgment result indicates that the first preset condition is met by the first time parameter and the second time parameter, the server may send a first operational instruction to the first device, so as to instruct the first device to send the first object to the second device.

Step 204: receiving the first object sent from the first device.

When it is determined that the first preset condition is met by the first time parameter and the second time parameter, the server makes a determination to allow the first device to transmit the first object to the second device.

Alternatively, when it is determined by the server that the third preset condition is met by the first spatial parameter and the second spatial parameter, the server makes a determination to allow the first device to transmit the first object to the second device.

The server may send the first operational instruction to the first device. After receiving the first operational instruction, the first device may transmit the first object to the second device according to the first operational instruction, and the second device receives the first object sent from the first device.

In the embodiment of the invention, the first device, the second device and the server perform processes so quickly that the user does not feel any waiting time. For example, if the first device is a cell phone, the display module is the touch screen of the cell phone, the second device is a notebook computer, the touch control module is the touch pad of the notebook computer, the user places the cell phone at the edge of the touch pad of the notebook computer, so that the edge of the touch screen of the cell phone contacts with the edge of the touch pad of the notebook computer, the user may directly transmit multimedia data in the cell phone to the notebook computer by a sliding operation, or transmit multimedia data in the notebook computer to the cell phone by a sliding operation.

Figure 3A:
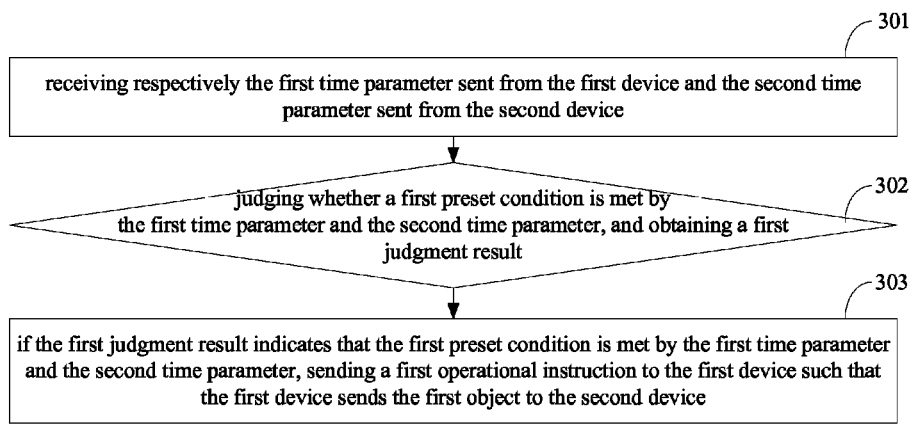
FIG. 3A is a main flow chart of a third information transmission method according to an embodiment of the invention.

Referring to FIG. 3A, the disclosure also provides an information transmission method which may be applied to the server. The server may communicate respectively with the first device and the second device. The first device and the second device may be in a first spatial position relationship. The main process of the method includes steps 301, 302, 303.

Step 301: receiving respectively the first time parameter sent from the first device and the second time parameter sent from the second device.

In the embodiment of the invention, in the moving of the first object within the display module, the first device may monitor the moving in real time, periodically or when triggered.

When it is detected that the first object reaches the first edge of the display module, the first device may obtain the current first time parameter, where the first time parameter may refer to the current time parameter of the first object.

In the embodiment of the invention, the first time parameter may be the first moment information about a moment when the first object reaches the first edge of the display module.

Preferably, in the embodiment of the invention, the first device may also acquire the first position parameter while acquiring the first time parameter, i.e., the first device may obtain the first spatial parameter at the same time. The first position parameter may be the first position information for the first object when the first object reaches the first edge of the display module.

In the embodiment of the invention, the first moment information and the first position information may be obtained simultaneously, i.e., at the first moment corresponding to the first moment information, the first object is located at a first position corresponding to the first position information.

In the embodiment of the invention, after obtaining the first time parameter, the first device may upload the first time parameter to the server. The server may process the first time parameter to determine whether to allow the first device to transmit the first object to the second device.

Alternatively, in the embodiment of the invention, if the first spatial parameter is obtained, the first device may upload the first spatial parameter to the server. The server may process the first spatial parameter to determine whether to allow the first device to transmit the first object to the second device.

In the embodiment of the invention, in the moving of the second object in the touch control module, the second device may monitor the process in real time, periodically or when triggered.

In the embodiment of the invention, when the first object reaches the first edge of the touch control module, the second device may obtain the current second time parameter, where the second time parameter may refer to the current time parameter of the first object.

In the embodiment of the invention, the second time parameter may be the second moment information about a moment when the first object reaches the first edge of the touch control module.

Preferably, in the embodiment of the invention, the second device may also acquire the second position parameter while acquiring the second time parameter, i.e., the second device may obtain the second spatial parameter. The second position parameter may be the second position information for the first object when the first object reaches the first edge of the touch control module.

In the embodiment of the invention, the second moment information and the second position information may be obtained simultaneously, i.e., at the second moment corresponding to the second moment information, the first object is located at a second position corresponding to the second position information.

In the embodiment of the invention, after obtaining the second time parameter, the second device may upload the second time parameter to the server. The server may process the second time parameter to determine whether to allow the first device to transmit the first object to the second device.

Alternatively, in the embodiment of the invention, if the second spatial parameter is obtained, the second device may upload the second spatial parameter to the server. The server may process the second spatial parameter to determine whether to allow the first device to transmit the first object to the second device.

Step 302: judging whether the first preset condition is met by the first time parameter and the second time parameter, and obtaining a first judgment result.

After obtaining the first time parameter and the second time parameter, the server may judge whether the first preset condition is met by the first time parameter and the second time parameter, and obtain the first judgment result. The first judgment result may be used to indicate whether the first preset condition is met by the first time parameter and the second time parameter.

In the embodiment of the invention, the server judging whether the first preset condition is met by the first time parameter and the second time parameter may be as follows:

the server may judge whether the first time difference between the second moment corresponding to the second moment information and the first moment corresponding to the first moment information is not greater than the preset time difference. If it is judged that the first time difference between the second moment corresponding to the second moment information and the first moment corresponding to the first moment information is not greater than the preset time difference, the first judgment result which indicates that the first preset condition is met by the first time parameter and the second time parameter may be obtained.

In the embodiment of the invention, if the first judgment result indicates that the first preset condition is met by the first time parameter and the second time parameter, the server may make a determination to allow the first device to transmit the first object to the second device.

Preferably, if the first device also uploads the first position parameter to the server and the second device also uploads the second position parameter to the server, the server may judge whether a second preset condition is met by the first position parameter and the second position parameter, and obtain a second judgment result. The second judgment result may be used to indicate whether the second preset condition is met by the first position parameter and the second position parameter. If it is judged that the first preset condition is met by the first time parameter and the second time parameter and the second preset condition is met by the first position parameter and the second position parameter, the server may make a determination to allow the first device to send the first object to the second device.

In the embodiment of the invention, the first preset condition may be that: the first time difference between the second moment corresponding to the second moment information and the first moment corresponding to the first moment information is not greater than the preset time difference.

In the embodiment of the invention, the second preset condition may be that: a first distance between the first position corresponding to the first position information and the second position corresponding to the second position information is not greater than the preset distance.

Alternatively, the first time parameter and the first position parameter may be collectively referred to as the first spatial parameter, and the second time parameter and the second position parameter may be collectively referred to as the second spatial parameter. The server may judge whether a third preset condition is met by the first spatial parameter and the second spatial parameter.

In the embodiment of the invention, the third preset condition may be that: the first time difference between the second moment corresponding to the second moment information and the first moment corresponding to the first moment information is not greater than the preset time difference, and the first distance between the first position corresponding to the first position information and the second position corresponding to the second position information is not greater than the preset distance.

Optionally, the server judging whether the third preset condition is met by the first spatial parameter and the second spatial parameter may be as follows:

the server may firstly judge whether the first distance between the first position corresponding to the first position information and the second position corresponding to the second position information is not greater than the preset distance; if it is judged that the first distance is not greater than the preset distance, the server may judge whether the first time difference between the second moment corresponding to the second moment information and the first moment corresponding to the first moment information is not greater than the preset time difference; if it is judged that the first time difference between the second moment corresponding to the second moment information and the first moment corresponding to the first moment information is not greater than the preset time difference, the first judgment result which indicates that the third preset condition is met by the first spatial parameter and the second spatial parameter may be obtained.

Alternatively, the server may firstly judge whether the first time difference between the second moment corresponding to the second moment information and the first moment corresponding to the first moment information is not greater than the preset time difference; if it is judged that the first time difference between the second moment corresponding to the second moment information and the first moment corresponding to the first moment information is not greater than the preset time difference, the server may judge whether the first distance between the first position corresponding to the first position information and the second position corresponding to the second position information is not greater than the preset distance; if it is judged that the first distance is not greater than the preset distance, the first judgment result which indicates that the third preset condition is met by the first spatial parameter and the second spatial parameter may be obtained.

In the embodiment of the invention, both the first position information and the second position information may be specific coordinate information, which may be coordinate information under the same coordinate system thus the first distance between the first position and the second position may be calculated according to specific coordinates, thereby the calculation result may be relatively accurate.

Step 303: if the first judgment result indicates that the first preset condition is met by the first time parameter and the second time parameter, sending a first operational instruction to the first device such that the first device sends the first object to the second device.

In the embodiment of the invention, if the first judgment result indicates that the first preset condition is met by the first time parameter and the second time parameter, the server may send the first operational instruction to the first device so as to instruct the first device to send the first object to the second device.

The embodiments of the invention are illustrated by taking a case that the first object is transmitted from the first device to the second device as an example. The technical solution that the first object is transmitted from the second device to the first device also falls in the scope of the disclosure. In the case where the first object is transmitted from the second device to the first device, the implementing process is the same as the process that the first object is transmitted from the first device to the second device.

In the embodiment of the invention, after step 303, if the user moves the first device or the second device, the spatial position relationship between the first device and the second device may change, and the first device may determine that the spatial position relationship between the first device and the second device is changed from the first spatial position relationship to a second spatial position relationship, where the first spatial position relationship is different from the second spatial position relationship.

For example, the first edge of the display module may correspond to the first edge of the first device, and the first edge of the touch control module may correspond to the first edge of the second device; and when the first device and the second device are in the first spatial position relationship, the first edge of the first device and the first edge of the second device may contact with each other.

When the first device and the second device are in the second spatial position relationship, the first edge of the first device and the first edge of the second device may not contact with each other. At this time, it may be the case that a second edge of the first device contacts with the first edge of the second device, or another edge of the first device contacts with another edge of the second device.

If the first object is moved from the first edge of the display module to the first edge of the touch control module when the first device and the second device are in the first spatial position relationship, then after the spatial position relationship between the first device and the second device is adjusted to the second spatial position relationship, if it needs to move a second object, the time required for moving the second object from the first edge of the display module to the first edge of the touch control module may be more than the time required for moving the first object, the incurred time difference may be greater than the preset time difference, the first preset condition may not be met by the first time parameter and the second time parameter, the server may not allow the first device to transmit the second object to the second device, and the transmission may fail.

Specifically, after it is determined that the spatial position relationship between the first device and the second device is changed from the first spatial position relationship to a second spatial position relationship different from the first spatial position relationship, if the first time parameter sent from the first device and the second time parameter sent from the second device are received, whether the first preset condition is met by the first time parameter and the second time parameter may be judged, and a first judgment result which indicates that the first preset condition is not met by the first time parameter and the second time parameter is obtained, the server may prohibit sending the first operational instruction, which instructs the first device to transmit a second object to the second device, to the first device, i.e., the transmission of the second object fails.

In the embodiment of the invention, if it is determined that the transmission fails, the second object may stay at the edge of the display module, i.e., the second object may stay at a first position corresponding to the first moment, where the first position is in the display module. The first moment may be the moment corresponding to the first time parameter.

Alternatively, if it is determined that the transmission fails, the second object may automatically return to the position in the display module where the second object is located before transmission.

The information transmission method according to the invention is introduced by several specific embodiments hereinafter, and several possible application scenes of the method are mainly introduced in the following embodiments. It should be noted that, the embodiments are only used to explain the invention without limiting the invention. All the embodiments conforming to the concept of the invention fall within the scope of the disclosure, and those skilled in the art may easily know how to make variations to the invention according to the concept of the invention.

First Embodiment

The first device is a cell phone, and the display module is a display screen of the cell phone. In the embodiment, the display screen is a touch display screen. The second device is a notebook computer, the touch control module is a touch pad of the notebook computer, and the touch pad does not have a display function.

Firstly, the first device may acquire a first operation, for example, the first operation may be an operation performed by an operating object on the display module. Preferably, in the embodiment of the invention, the display module may be a touch display module, i.e., the display module supports touch control operation, and a user may perform directly on the display module a touch control operation toward the at least one object included in the display module.

In the embodiment, the first operation may be a moving operation, i.e., the operation of moving a first object on the display module by the operating object, where the first object may be one of the at least one object. In the embodiment, the first object may refer to multimedia data.

After acquiring the first operation, the first device may move, in response to the first operation, the first object included in the display module from the display module to the touch control module.

In the embodiment, because the display module contacts with the touch control module, the first device may move, in response to the first operation, the first object from the display module to a first edge of the display module. When the first object reaches the first edge, the first object is directly moved from the first edge of the display module to a first edge of the touch control module without stay. When the first object reaches the first edge of the touch control module, it means the moving is already completed and the first object is already moved from the first device to the second device. In order to ensure that the first object is moved from the first device to the second device, when the first object reaches the first edge of the touch control module, the first object may be moved to the touch control module without stay, hence it may ensure that the first object is successfully moved.

In the embodiment, the first edge of the display module may correspond to the first edge of the first device, and the first edge of the touch control module may correspond to the first edge of the second device, where the first edge of the first device may contact with the first edge of the second device.

In the embodiment, in the moving of the first object within the display module, the first device may monitor the moving in real time, periodically or when triggered.

When it is detected that the first object reaches the first edge of the display module, the first device may acquire the current first time parameter, where the first time parameter may refer to the current time parameter of the first object.

In the embodiment, the first time parameter may be the first moment information about a moment when the first object reaches the first edge of the display module.

In the embodiment, after obtaining the first time parameter, the first device may upload the first time parameter to a server. The server may process the first time parameter to determine whether to allow the first device to transmit the first object to the second device.

In the embodiment, in the moving of the second object in the touch control module, the second device may monitor the moving in real time, periodically or when triggered.

In the embodiment, when the first object reaches the first edge of the touch control module, the second device may acquire a current second time parameter, the second time parameter may refer to the current time parameter of the first object.

In the embodiment, the second time parameter includes at least the second moment information about a moment when the first object reaches the first edge of the display module.

In the embodiment, after acquiring the first time parameter, the second device may upload the second time parameter to the server, and the server may process the second time parameter to determine whether to allow the first device to transmit the first object to the second device.

After the server acquires the first time parameter and the second time parameter, the server may judge whether a first preset condition is met by the first time parameter and the second time parameter, and acquire a first judgment result. If the first judgment result indicates that the first preset condition is met by the first time parameter and the second time parameter, then the server makes a determination to allow the first device to transmit the first object to the second device. The server may send a first operational instruction to the first device to instruct the first device to transmit the first object to the second device.

In the embodiment, the first object is an image displayed in the display module of the first device, and after the first object is transmitted to the second device, the display module of the second device may display the first object, and the display module of the first device may continue displaying the image.

Second Embodiment

The first device is a cell phone, and the display module is a display screen of the cell phone. In the embodiment, the display screen is a touch display screen. The second device is a notebook computer, the touch control module is a touch pad of the notebook computer, and the touch pad does not have a display function.

Firstly, the second device may acquire the first operation, for example, the first operation may be an operation performed on the touch control module by an operating object. Although the first operation is made on the touch control module, the first operation aims at the first object displayed on the display module of the second device. Preferably, in the embodiment, the display module of the first device may be a touch display module, i.e., the display module of the first device supports touch control operation.

In the embodiment, the first operation may be a moving operation, i.e., moving a first object on the touch control module of the second device by the operating object, where the first object may be one of the at least one object. In the embodiment, the first object may refer to multimedia data.

After acquiring the first operation, the second device may move, in response to the first operation, the first object included in the display module of the second device to the display module of the first device via the touch control module.

In the embodiment, the second device may move, in response to the first operation, the first object to the first edge of the display module of the first device via the touch control module, and when the first object reaches the first edge of the touch control module, the first object is directly moved from the first edge of the touch control module to the first edge of the display module of the first device without stay. When the first object reaches the first edge of the display module of the first device, it means that the moving is already completed and the first object is already moved from the second device to the first device. In order to ensure that the first object is moved from the second device to the first device, when the first object reaches the first edge of the display module of the first device, the first object may be moved to the display module of the first device without stay, hence it may ensure that the first object is successfully moved.

In the embodiment, the first edge of the display module may correspond to the first edge of the first device, the first edge of the touch control module may correspond to the first edge of the second device, where the first edge of the first device may contact with the first edge of the second device.

In the embodiment, in the moving of the first object in the touch control module, the second device may monitor the moving in real time, periodically or when triggered.

In the embodiment, when the first object reaches the first edge of the touch control module, the second device may acquire the current second spatial parameter, where the second spatial parameter may refer to the current spatial parameter of the first object.

In the embodiment, the second spatial parameter includes at least the second moment information about a moment when the first object reaches the first edge of the touch control module and the second position information about a position where the first object is currently on the touch control module. The second moment information and the second position information may be obtained simultaneously, i.e., at a second moment corresponding to the second moment information, the first object is located at a second position corresponding to the second position information.

In the embodiment, after acquiring the second spatial parameter, the second device may upload the second spatial parameter to the server, and the server may process the second spatial parameter.

In the embodiment, in the moving of the first object in the display module of the first device, the first device may monitor the moving in real time, periodically or when triggered.

When it is detected that the first object reaches the first edge of the display module of the first device, the first device may acquire the current first spatial parameter, where the first spatial parameter may refer to the current spatial parameter of the first object.

In the embodiment, the first spatial parameter includes at least the first moment information about a moment when the first object reaches the first edge of the display module of the first device and the first position information about a position where the first object is currently on the display module of the first device. The first moment information and the first position information may be acquired simultaneously, i.e., at a first moment corresponding to the first moment information, the first object is located at a first position corresponding to the first position information.

In the embodiment, after acquiring the first spatial parameter, the first device may upload the first spatial parameter to the server, and the server may process the first spatial parameter.

After the server acquires the first spatial parameter and the second spatial parameter, the server may judge whether a third preset condition is met by the first spatial parameter and the second spatial parameter, and obtain a first judgment result. If the first judgment result indicates that the third preset condition is met by the first spatial parameter and the second spatial parameter, the server makes a determination to allow the first device to transmit the first object to the second device. The server may send a first operational instruction to the first device to instruct the first device to send the first object to the second device.

In the embodiment, the server judging whether the third preset condition is met by the first spatial parameter and the second spatial parameter may be as follows:

The server firstly judges whether a first distance between the first position corresponding to the first position information and the second position corresponding to the second position information is not greater than a preset distance, if it is judged that the first distance is not greater than the preset distance, then the server may judge whether a first time difference between a second moment corresponding to the second moment information and the first moment corresponding to the first moment information is not greater than a preset time difference, if it is judged that the first time difference between the second moment corresponding to the second moment information and the first moment corresponding to the first moment information is not greater than a preset time difference, then the first judgment result which indicates that the third preset condition is met by the first spatial parameter and the second spatial parameter may be obtained.

In the embodiment, the first object is a video displayed in the display module of the first device, and after the first object is transmitted to the second device, the display module of the second device may display the first object, and the display module of the first device may continue displaying the video.

Third Embodiment

The first device is a cell phone, and the display module is a display screen of the cell phone. In the embodiment, the display screen is a touch display screen. The second device is a notebook computer, the touch control module is a touch pad of the notebook computer, and the touch pad does not have a display function.

First Stage

Firstly, the first device may acquire a first operation, for example, the first operation may be an operation performed on the display module by an operating object. Preferably, in the embodiment of the invention, the display module may be a touch display module, i.e., the display module supports a touch control operation, and a user may perform directly on the display module a touch control operation toward the at least one object included in the display module.

In the embodiment, the first operation may be a moving operation, i.e., moving a first object on the display module by the operating object, where the first object may be one of the at least one object. In the embodiment, the first object may refer to multimedia data.

After acquiring the first operation, the first device may move, in response to the first operation, the first object included in the display module from the display module to the touch control module.

In the embodiment, the first device may move, in response to the first operation, the first object from the display module to the first edge of the display module. When the first object reaches the first edge, the first object is directly moved from the first edge of the display module to the first edge of the touch control module without stay. When the first object reaches the first edge of the touch control module, it means that the moving is already completed and the first object is already moved from the first device to the second device. In order to ensure that the first object is moved from the first device to the second device, when the first object reaches the first edge of the touch control module, the first object may be moved to the touch control module without stay, hence it may ensure that the first object is successfully moved.

Figure 3B:
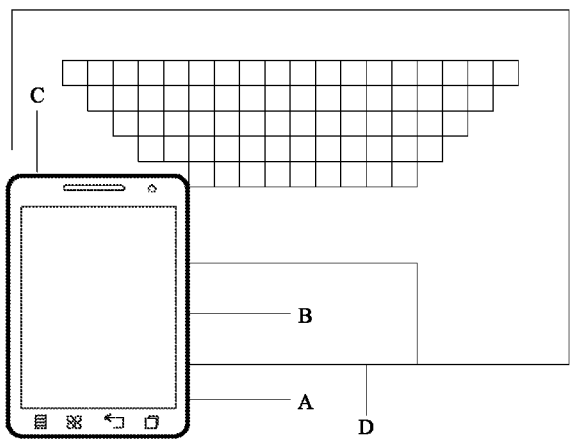
FIG. 3B is a schematic diagram showing a case that the first device and the second device are in a first spatial position relationship.

In the embodiment, the first edge of the display module may correspond to the first edge of the first device, the first edge of the touch control module may correspond to the first edge of the second device, where the first edge of the first device may contact with the first edge of the second device. As shown in FIG. 3B, a reference numeral A in FIG. 3B indicates the first edge of the display module, a reference numeral B indicates the first edge of the touch control module, a reference numeral C indicates a second edge of the display module, and a reference numeral D indicates a second edge of the touch control module.

In the embodiment, in the moving of the first object in the display module, the first device may monitor the moving in real time, periodically or when triggered.

When it is detected that the first object reaches the first edge of the display module, the first device may acquire the current first spatial parameter, where the first spatial parameter may refer to the current spatial parameter of the first object.

In the embodiment, the first spatial parameter includes at least the first moment information about a moment when the first object reaches the first edge of the display module and the first position information about a position where the first object is currently on the display module. The first moment information and the first position information may be acquired simultaneously, i.e., at a first moment corresponding to the first moment information, the first object is located at a first position corresponding to the first position information.

In the embodiment, after acquiring the first spatial parameter, the first device may upload the first spatial parameter to the server, and the server may process the first spatial parameter.

In the embodiment, in the moving of the first object in the touch control module, the second device may monitor the moving in real time, periodically or when triggered.

In the embodiment, when the first object reaches the first edge of the touch control module, the second device may acquire the current second spatial parameter, where the second spatial parameter may refer to the current spatial parameter of the first object.

In the embodiment, the second spatial parameter includes at least the second moment information about a moment when the first object reaches the first edge of the touch control module and the second position information about a position where the first object is currently on the touch control module. The second moment information and the second position information may be acquired simultaneously, i.e., at a second moment corresponding to the second moment information, the first object is located at a second position corresponding to the second position information.

In the embodiment, after acquiring the first spatial parameter, the second device may upload the second spatial parameter to the server, and the server may process the second spatial parameter.

After the server acquires the first spatial parameter and the second spatial parameter, the server may judge whether a third preset condition is met by the first spatial parameter and the second spatial parameter, and obtain a first judgment result. If the first judgment result indicates that the third preset condition is met by the first spatial parameter and the second spatial parameter, the server makes a determination to allow the first device to transmit the first object to the second device. The server may send a first operational instruction to the first device to instruct the first device to send the first object to the second device.

In the embodiment, the server judging whether the third preset condition is met by the first spatial parameter and the second spatial parameter may be as follows:

The server may firstly judge whether a first time difference between a second moment corresponding to the second moment information and the first moment corresponding to the first moment information is not greater than a preset time difference, if it is judged that the first time difference between the second moment corresponding to the second moment information and the first moment corresponding to the first moment information is not greater than the preset time difference, then the server may judge whether a first distance between the first position corresponding to the first position information and the second position corresponding to the second position information is not greater than a preset distance, if it is judged that the first distance is not greater than the preset distance, the first judgment result which indicates that the third preset condition is met by the first spatial parameter and the second spatial parameter may be obtained.

In the embodiment, both the first position information and the second position information may be specific coordinate information, which may be coordinate information in the same coordinate system, thus the first distance between the first position and the second position may be calculated according to specific coordinates, thereby the calculation result may be relatively accurate.

In the embodiment, the first object is an audio object displayed in the display module of the first device, and after the first object is transmitted to the second device, the display module of the second device may display the first object, and the display module of the first device may continue displaying the audio object.

Second Stage

Figure 3C:
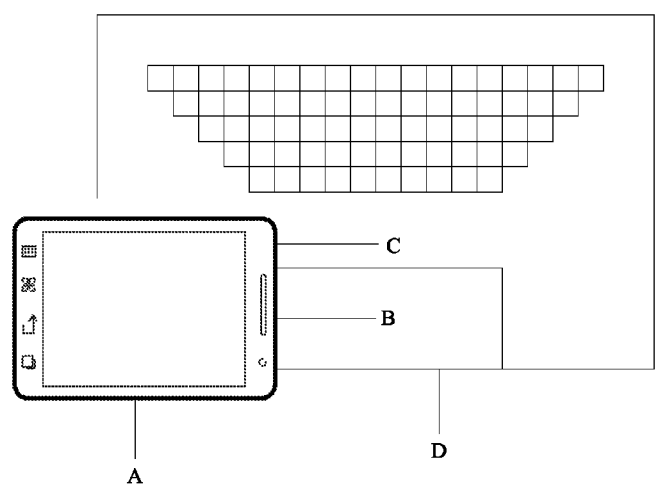
FIG. 3C is a schematic diagram showing a case that the first device and the second device are in a second spatial position relationship.

A spatial position of the first device is changed, as shown in FIG. 3C which is a schematic diagram showing the first device and the second device after the spatial position of the first device is changed. After the spatial position of the first device is changed, it is needed to move a second object displayed in display module from the first device to the second device.

In the embodiment, after the spatial position of the first device is changed, a second edge of the display module may correspond to a second edge of the first device, the first edge of the touch control module may correspond to the first edge of the second device, where the second edge of the first device may contact with the first edge of the second device.

In the first stage, the first object is moved from the first edge of the display module to the first edge of the touch control module. In this stage, the second object will be moved from the first edge of the display module to the second edge of the touch control module.

The first device may acquire a first operation, for example, the first operation may be an operation performed on the display module by an operating object.

In the embodiment, in the moving of the second object in the touch control module, the second device may monitor the moving in real time, periodically or when triggered.

In the embodiment, when the second object reaches the second edge of the touch control module, the second device may acquire the current second time parameter, where the second time parameter may refer to the current time parameter of the first object.

In the embodiment, the second time parameter may be the second moment information about a moment when the first object reaches the second edge of the touch control module.

In the embodiment, after acquiring the first spatial parameter, the first device may upload the first spatial parameter to the server, and the server may process the first spatial parameter.

In the embodiment, in the moving of the second object in the touch control module, the second device may monitor the moving in real time, periodically or when triggered.

In the embodiment, when the second object reaches the second edge of the touch control module, the second device may acquire the current second time parameter, where the second time parameter may refer to the current time parameter of the first object.

In the embodiment, the second spatial parameter includes at least the second moment information about a moment when the second object reaches the second edge of the touch control module.

In the embodiment, after acquiring the first time parameter, the second device may upload the second time parameter to the server, and the server may process the second time parameter.

After the server acquires the first time parameter and the second time parameter, the server may judge whether a third preset condition is met by the first time parameter and the second time parameter, and acquire a first judgment result. If the first judgment result indicates that the third preset condition is met by the first time parameter and the second time parameter, the server makes a determination to allow the first device to transmit the second object to the second device. The server may send a second operational instruction to the first device to instruct the first device to send the second object to the second device.

In the embodiment, the first edge of the display module corresponds to the first edge of the first device, the second edge of the touch control module corresponds to the second edge of the second device, and the first edge of the first device does not contact with the second edge of the second device. Therefore, when the second object is moved from the first edge of the display module to the second edge of the touch control module, the required time may be relatively long, and even may exceed the preset time difference.

In the embodiment, if it is judged that the first time difference between the second moment and the first moment is greater than the preset time difference, then the first judgment result indicates that the third preset condition is not met by the first time parameter and the second time parameter, the server makes a determination to not allow the first device to transmit the second object to the second device, and the server may not transmit a second operational instruction to the first device. The second moment is a moment corresponding to the second time parameter, and the first moment is a moment corresponding to the first time parameter.

At this time, it may be determined that the transmission fails, the second object may continuously stay at the edge of the display module, i.e., the second object may stay at the first position corresponding to the first moment, and the first position is located in the display module.

Alternatively, if it is determined that the transmission fails, the second object may automatically return to a position in the display module where the second object is located before the transmission.

Figure 4:
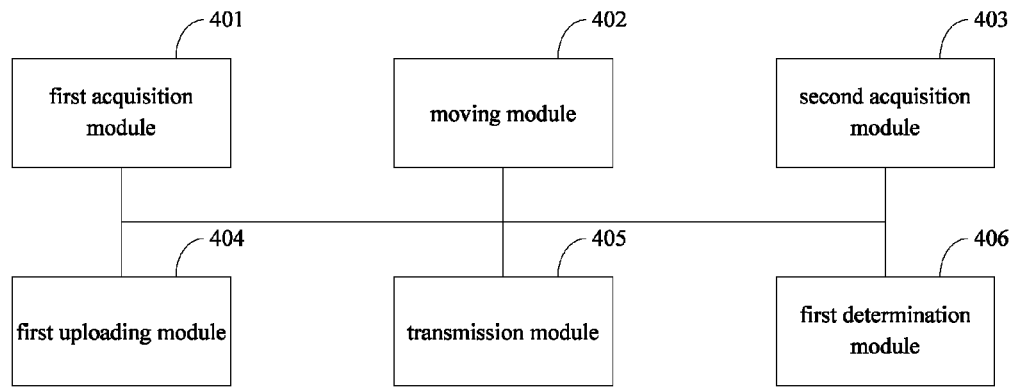
FIG. 4 is a main structure diagram of the first device according to an embodiment of the invention.

Referring to FIG. 4, the disclosure provides a device which can communicate respectively with the second device and the server, where the device may have the display module, the second device may have the touch control module, and the touch control module may not have a display function, the display module may display therein at least one object, and the first device and the second device may be in a first spatial position relationship. The device in the embodiment may be the first device. The first device may include a first acquisition module 401, a moving module 402, a second acquisition module 403, a first uploading module 404 and a transmission module 405.

The first acquisition module 401 may be configured to acquire a first operation.

The moving module 402 may be configured to move, in response to the first operation, a first object of the at least one object displayed in the display module from the display module to the touch control module.

In the embodiment of the invention, the first object may be multimedia data.

The second acquisition module 403 may be configured to acquire the current first time parameter when it is detected that the first object reaches a first edge of the display module.

In the embodiment of the invention, the first time parameter may be first moment information about a moment when the first object reaches the first edge of the display module.

The first uploading module 404 may be configured to upload the first time parameter to a server, so that the server determines, according to the first time parameter and the second time parameter uploaded by the second device, whether to allow the first device to transmit the first object to the second device.

The transmission module 405 may be configured to transmit the first object to the second device according to a first operational instruction sent from the server.

Preferably, the first device may further include a first determination module 406.

The first determination module 406 may be configured to determine that the spatial position relationship between the first device and the second electronic is changed from the first spatial position relationship to a second spatial position relationship different from the first spatial position relationship.

Figure 5:
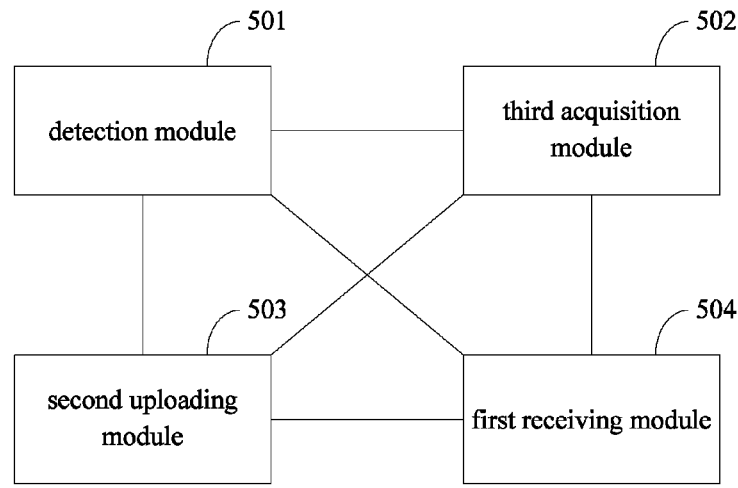
FIG. 5 is a main structure diagram of the second device according to an embodiment of the invention.

Referring to FIG. 5, the disclosure further provides a device which can communicate respectively with the first device and the server, where the first device may have the display module, the device may have a touch control module, the touch control module may not have a display function, the display module displays therein at least one object, and the first device and the second device may be in a first spatial position relationship. In the embodiment of the invention, the device may refer to the second device. The second device may include a detection module 501, a third acquisition module 502, a second uploading module 503 and a receiving module 504.

The detection module 501 may be configured to detect that a second operation occurs at a first edge of the touch control module, where the first edge of the touch control module is an edge where the touch control module contacts with the display module.

The third acquisition module 502 may be configured to acquire, in respond to the second operation, the current second time parameter.

The second uploading module 503 may be configured to upload the second time parameter to the server, so that the server determines, according to the second time parameter and the first time parameter uploaded by the first device, whether to allow the first device to transmit the first object to the second device.

The first receiving module 504 may be configured to receive the first object sent from the first device.

In the embodiment of the invention, the first object may be multimedia data.

In the embodiment of the invention, the second time parameter may be the second moment information about a moment when it is detected that the second operation occurs at the first edge of the touch control module.

Figure 6:
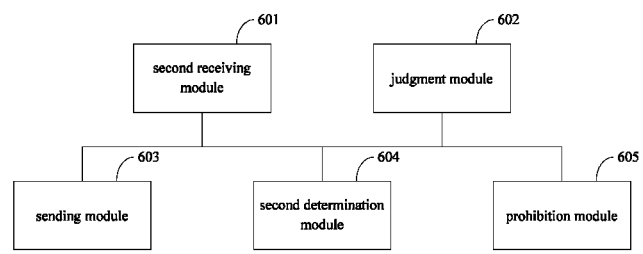
FIG. 6 is a main structure diagram of the server according to an embodiment of the invention.

Referring to FIG. 6, the disclosure further provides a server which can communicate respectively with the first device and the second device, where the first device and the second device may be in a first spatial position relationship. The server may include a second receiving module 601, a judgment module 602 and a sending module 603.

The second receiving module 601 may be configured to receive respectively first time parameter sent from the first device and second time parameter sent from the second device.

The second receiving module 601 may be further configured to receive respectively first position parameter sent from the first device and second position parameter sent from the second device.

In the embodiment of the invention, the first position parameter may be first position information for the first object when the first object reaches a first edge of the display module, and the second position parameter may be second position information for the first object when it is detected that the second operation occurs at a first edge of the touch control module.

The judgment module 602 may be configured to judge whether a first preset condition is met by the first time parameter and the second time parameter, and obtain a first judgment result.

The judgment module 602 may be configured to judge whether the first time difference between a second moment corresponding to the second moment information and a first moment corresponding to the first moment information is greater than a preset time difference; if it is judged that the first time difference is not greater than the preset time difference, the first judgment result which indicates that the first preset condition is met by the first time parameter and the second time parameter is obtained.

The judgment module 602 may also be configured to judge whether a second preset condition is met by the first position parameter and the second position parameter, and obtain a second judgment result; and if the second judgment result indicates that the second preset condition is met by the first position parameter and the second position parameter, judge whether the first preset condition is met by the first time parameter and the second time parameter.

The sending module 603 may be configured to, if the first judgment result indicates that the first preset condition is met by the first time parameter and the second time parameter, send a first operational instruction to the first device such that the first device sends the first object to the second device.

Preferably, the server may further include a second determination module 604, which may be configured to determine that the spatial position relationship between the first device and the second electronic is changed from the first spatial position relationship to a second spatial position relationship different from the first spatial position relationship.

Preferably, the server may further include a prohibition module 605, which may be configured to, if the first judgment result indicates that the first preset condition is not met by the first time parameter and the second time parameter, prohibit sending the first operational instruction to the first device, wherein the first operational instruction instructs the first device to transmit a second object to the second electric device.

In the embodiment of the invention, the first time parameter may be first moment information about a moment when the first object reaches a first edge of the display module, and the second time parameter may be the second moment information about a moment when it is detected that the second operation occurs at the first edge of the touch control module.

The information transmission method according to the embodiments of the invention may be applied to a first device. The first device may communicate with a second device; the first device may have a display module, and the second device may have a touch control module not capable of displaying, the display module contacts with the touch control module, and the display module includes therein at least one object. The method may include: acquiring a first operation; moving, in response to the first operation, a first object of the at least one object included in the display module from the display module to the touch control module; acquiring the current first spatial parameter when it is detected that the first object reaches a first edge of the display module, where the first edge of the display module is an edge where the display module contacts with the touch control module; uploading the first spatial parameter to the server; and transmitting the first object to the second device according to a first operational instruction sent from the server.

In the embodiments of the invention, when the display module contacts with the touch control module, the first object included in the display module may be moved directly to the touch control module. When the first object is moved to the touch control module, the first object may be transmitted to the second device, hence the data transmission between a cell phone and a computer may be realized without a dedicated transmission line; and the operation is simple, thereby enhancing the transmission efficiency.

It should be understood by those skilled in the art that the embodiments of the invention may be embodied as a method, system or computer program product. Accordingly, the disclosure may be implemented in the form of hardware only, software only or a combination of software and hardware. Moreover, the disclosure may be implemented in the form of computer program product embodied as one and more computer executable storage mediums (including but not limited to disk storage, optical memory, and the like) in which computer executable program codes are included.

The disclosure has been described with reference to the flow charts and/or block diagrams of a method, device and computer program product according to the embodiments of the invention. It should be understood that each flow and/or block in the flow charts and/or block diagrams, and a combination of the flows and/or blocks in the flow charts and/or block diagrams may be implemented by the computer program instructions. Those computer program instructions may be provided to a processor of a general purpose computer, a dedicated computer, an embedded processing system or other programmable data processing devices to generate a machine, so that the instructions executed by the processors of the computer or other programmable data processing devices generates an apparatus which is configured to implement the functions specified in a flow or flows in the flowchart and/or a block or blocks in the block diagrams.

Those computer program instructions can also be stored in a computer-readable storage that can instruct a computer or other programmable data processing devices to operate in a particular way, so that the instructions stored in this computer-readable storage generate the manufactured goods including instruction apparatus, where the instruction apparatus implements the function specified in a flow or flows in the flowchart and/or a block or blocks in the block diagrams.

Those computer program instructions may also be loaded onto a computer or other programmable data processing device, so that a series of operations are performed on the computer or other programmable data processing device to achieve the processing implemented by a computer. Thus, the instructions executed on the computer or other programmable data processing devices provide the steps for implementing the function specified in a flow or flows in the flowchart and/or a block or blocks in the block diagrams.

Obviously, various modifications and variations can be made to the disclosure without departing from the spirit and scope of the disclosure by those skilled in the art. Thus, if those modifications and variations to the disclosure are within the scope of the claims of the disclosure and equivalents thereof, the disclosure intends to include these modifications and variations.

The invention claimed is:

1. An information transmission method applied to a first device, wherein the first device is capable of communicating respectively with a second device and a server, the first device comprises a display module, the second device comprises a touch control module not capable of displaying, the display module displays at least one object, the first device and the second device are in a first spatial position relationship, and the method comprises:

acquiring a first operation;

moving, in response to the first operation, a first object of the at least one object displayed in the display module from the display module to the touch control module;

acquiring current first time parameter when it is detected that the first object reaches a first edge of the display module;

uploading the first time parameter to a server, so that the server determines, according to the first time parameter and second time parameter uploaded by the second device, whether to allow the first device to transmit the first object to the second device; and transmitting the first object to the second device according to a first operational instruction sent from the server.

2. The method according to claim 1, wherein the first time parameter is a first moment information of a moment when the first object reaches the first edge of the display module.

3. The method according to claim 1, wherein after the transmitting the first object to the second device according to a first operational instruction sent from the server, the method further comprises: determining that a spatial position relationship between the first device and the second device is changed from the first spatial position relationship to a second spatial position relationship different from the first spatial position relationship.

4. An information transmission method applied to a second device, wherein the second device is capable of communicating respectively with a first device and a server, the first device comprises a display module, the second device comprises a touch control module not capable of displaying, the display module displays at least one object, the first device and the second device are in a first spatial position relationship, and the method comprises:

detecting that a second operation occurs at a first edge of the touch control module;

acquiring, in response to the second operation, a current second time parameter;

uploading the second time parameter to a server, so that the server determines, according to the second time parameter and a first time parameter uploaded by the first device, whether to allow the first device to transmit a first object of the at least one object to the second device; and receiving the first object sent from the first device.

5. The method according to claim 4, wherein the second time parameter is a second moment information of a moment in response to a detection that the second operation occurs at the first edge of the touch control module.

6. An information transmission method applied to a server, wherein the server is capable of communicating respectively with a first device and a second device, the first device comprises a display module, the second device comprises a touch control module not capable of displaying, the first device and the second device are in a first spatial position relationship, and the method comprises:

receiving respectively a first time parameter sent from the first device and a second time parameter sent from the second device;

judging whether a first preset condition is met by the first time parameter and the second time parameter, and obtaining a first judgment result; and in a case that the first judgment result indicates that the first preset condition is met by the first time parameter and the second time parameter, sending a first operational instruction to the first device such that the first device sends a first object to the second device, wherein the first time parameter is a first moment information of a moment when the first object reaches a first edge of the display module, and the second time parameter is a second moment information of a moment when it is detected that a second operation occurs at a first edge of the touch control module.

7. The method according to claim 6, wherein the judging whether a first preset condition is met by the first time parameter and the second time parameter comprises:

judging whether a first time difference between a second moment corresponding to the second moment information and a first moment corresponding to the first moment information is not greater than a preset time difference; and in a case that the first time difference is not greater than the preset time difference, obtaining the first judgment result indicating that the first preset condition is met by the first time parameter and the second time parameter.

8. The method according to claim 6, wherein after or before the receiving of the first time parameter sent from the first device and the second time parameter sent from the second device, the method further comprises: receiving respectively a first position parameter sent from the first device and a second position parameter sent from the second device.

9. The method according to claim 8, wherein the first position parameter is first position information for the first object when the first object reaches a first edge of the display module, and the second position parameter is second position information for the first object when it is detected that a second operation occurs at a first edge of the touch control module.

10. The method according to claim 9, wherein before the judging whether a first preset condition is met by the first time parameter and the second time parameter, the method further comprises: judging whether a second preset condition is met by the first position parameter and the second position parameter, and obtaining a second judgment result; and the judging whether a first preset condition is met by the first time parameter and the second time parameter comprises: in a case that the second judgment result indicates that the second preset condition is met by the first position parameter and the second position parameter, judging whether the first preset condition is met by the first time parameter and the second time parameter.

11. The method according to claim 9, wherein before the sending a first operational instruction to the first device, the method further comprises: judging whether a second preset condition is met by the first position parameter and the second position parameter, and obtaining a second judgment result; and the sending a first operational instruction to the first device comprises: in a case that the second judgment result indicates that the second preset condition is met by the first position parameter and the second position parameter, judging whether the first preset condition is met by the first time parameter and the second time parameter.

12. The method according to claim 6, wherein after the sending a first operational instruction to the first device such that the first device sends a first object to the second device in a case that the first judgment result indicates that the first preset condition is met by the first time parameter and the second time parameter, the method further comprises: determining that a spatial position relationship between the first device and the second device is changed from the first spatial position relationship to a second spatial position relationship different from the first spatial position relationship.

13. The method according to claim 12, wherein after the determining that a spatial position relationship between the first device and the second device is changed from the first spatial position relationship to a second spatial position relationship different from the first spatial position relationship, the method further comprises:
- receiving respectively the first time parameter sent from the first device and the second time parameter sent from the second device;
- judging whether the first preset condition is met by the first time parameter and the second time parameter, and obtaining the first judgment result; and
- in a case that the first judgment result indicates that the first preset condition is not met by the first time parameter and the second time parameter, prohibiting sending the first operational instruction to the first device, wherein the first operational instruction instructs the first device to transmit a second object to the second device.

* * * * *